United States Patent

[11] 3,553,496

[72] Inventor Werner Gustav Wilhelm Weiss
 Gieboldehausen, Germany
[21] Appl. No. 720,519
[22] Filed Apr. 11, 1968
[45] Patented Jan. 5, 1971
[73] Assignee Felten & Guilleaume Fernmeldeanlagen G.m.b.H.
 Nurnberg, Germany
 a company of Germany

[54] SWITCHING ARRANGEMENT COMPRISING A TUNNEL DIODE
5 Claims, 5 Drawing Figs.

[52] U.S. Cl. .................................................. 307/286, 307/235, 307/322
[51] Int. Cl. .................................................. H03k 3/315
[50] Field of Search .......................................... 307/286, 235; 330/30D, 69

[56] References Cited
UNITED STATES PATENTS
| | | | |
|---|---|---|---|
| 2,676,286 | 4/1954 | Buchner | 330/69 |
| 3,215,854 | 11/1965 | Mayhew | 307/286 |
| 3,254,238 | 5/1966 | Cooperman | 307/286 |
| 3,436,560 | 4/1969 | Marchais | 307/235 |

Primary Examiner—Donald D. Forrer
Assistant Examiner—Harold A. Dixon
Attorney—Halman & Stern ABSTRACT: A switching arrangement comprising a tunnel diode, for the monitoring or control of a voltage range, having a differential amplifier with two outlets, one input of which is connected to a reference voltage, a series circuit of two diodes of opposite polarity being situated between its two outlets, at which the potential varies inversely, and wherein a series circuit of a tunnel diode and an adjustable source of direct voltage is arranged between the point of connection of these diodes and the nonearthed terminal of the source of supply voltage, in such a manner that the terminals of identical polarity of the two sources of voltage are interconnected, the direction of passage of the diodes being orientated towards the point of connection between the diodes and the tunnel diode, at which the output voltage is also tapped off.

PATENTED JAN 5 1971  3,553,496

INVENTOR
WERNER G.W. WEISS
BY
ATTORNEYS

SWITCHING ARRANGEMENT COMPRISING A TUNNEL DIODE

The present invention has as its object a circuit or switching arrangement comprising a tunnel diode, for the monitoring or control of a voltage range.

The need frequently arises to monitor or control chronologically variable voltages in the electronic measurement and control techniques. The output voltage of a control or supervision circuit changes suddenly when the voltage to be observed reaches a definite value, being the so-called response value. Many such voltage control or supervision circuits have become known, for example so-called Schmitt trigger circuits or such as comprise zener diodes or tunnel diodes.

A specific voltage range must frequently be observed. Two separate control circuits are then employed, whereof the response values are displaced relative to each other by a definite potential corresponding to the said voltage range. It is difficult in such case to establish direct current coupling of the two control circuits having different response values, with the voltage to be observed or controlled. The possibilities of special displacement voltages, different supply voltages or even of different sizes of the two control circuits, must be exploited in onerous manner, for this purpose. The response values of the two control circuits must be adjusted separately. They vary in identical or at least similar manner, as a function of fluctuations in temperature and supply voltage, but independently of each other. It is very difficult to accomplish a stable symmetrical position about a specific voltage value by this method. A considerable number of components elements is necessary to build up the said arrangements for control or supervision of a voltage range, so that the said arrangements are very unwieldy as well as being very liable to fail.

The circuit according to the invention is intended to eliminate these shortcomings. It is characterized by a differential amplifier with two outlets, whereof one input is connected to a datum or reference voltage, a series circuit of two diodes of opposite polarity being situated between its two outlets, at which the potential varies inversely, and wherein a series circuit of a tunnel diode and an adjustable source of direct voltage is arranged between the point of connection of these diodes and the nonearthed terminal of the source of supply voltage, in such manner that the terminals of identical polarity of the two sources of voltage are interconnected, the direction of passage of the diodes being oriented towards the point of connection between the diodes and the tunnel diode, at which the output voltage is also tapped off.

The width or span of the voltage range to be controlled or observed may be adjusted in simple manner symmetrically to the datum voltage by varying the voltage delivered by the source of direct voltage connected in series with the tunnel diode and/or by varying the magnitude of two identical emitter resistances in the input stage of the differential amplifier. The datum voltage may be controlled in chronological manner in order to resolve complex control problems. Exceeding the limits of the said range in either direction may be indicated by differentiation of the output voltage obtained at the tunnel diode and by selection of the pulses obtained thereby, according to their polarity.

The control or supervision circuit according to the invention comprises a substantially smaller number of component elements than two separate circuits of this nature. It is very reliable and inexpensive, therefore. Generation of the output voltage is performed by a tunnel diode which, as known, switches very rapidly. The permissible speed of variation of the voltage evolution which is to be controlled or observed thus depends essentially on the transistors employed only, and may be very high if appropriate types are employed.

The invention will now be described in detail with reference to the accompanying drawings, which show an embodiment of the invention, but in no restrictive sense.

Figure 1:
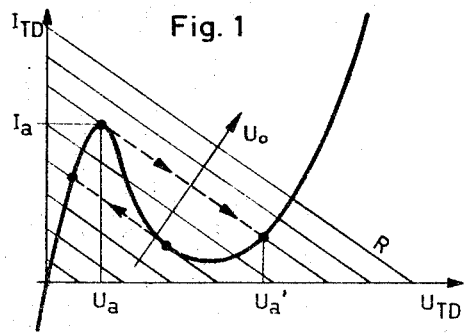
FIGS. 1 and 2 illustrate the mode of operation of the tunnel diode.
Figure 2:
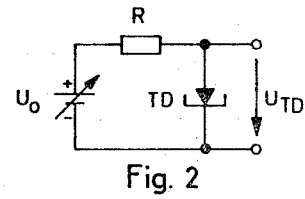

FIG. 1 shows the current-potential characteristic of a tunnel diode, and FIG. 2 shows a circuit in which a tunnel diode is operated through a resistance which is greater than the value of the lowest resistance of the tunnel diode in the dropping portion of the characteristic curve. If the supply voltage $U_o$ is increased, the voltage occurring at the tunnel diode, as the current increases from nought, rises but little initially, the tunnel diode having a low resistance in this portion of the characteristic curve. When the current $I_a$ is reached, the voltage occurring at the tunnel diode changes suddenly from the low value $U_a$ to the high value $U_a'$, the tunnel diode switching over from a low-resistance range to a high-resistance range. The amplitude of the voltage range skipped in each instance depends on whether the voltage $U_o$ increases or decreases, being a little greater when switching over from the low-resistance range to the high-resistance range than when switching over from the high-resistance range to the low-resistance range. It depends on the magnitude of the resistance R.

Figure 3:
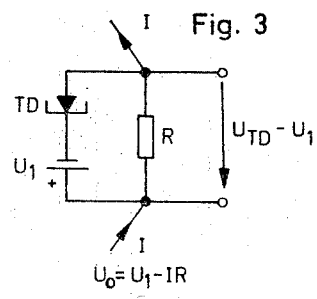
FIG. 3 shows a tunnel diode switch which is switched by priming potential and by afflux.

The arrangement illustrated in FIG. 3 shows the manner in which the variable voltage $U_o$ may be replaced by a priming voltage $U_1$ and by a voltage drop engendered at the resistance R by a variable current I. The switching elements are so rated that the tunnel diode is in the high potential state if no current flows through the resistance.

Figure 4:
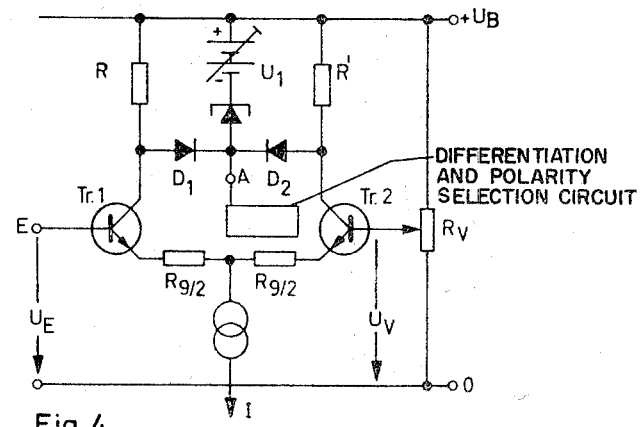
FIG. 4 illustrates an embodiment of a circuit according to the invention, given by way of example.

FIG. 4 shows an embodiment of the circuit or switching arrangement according to the invention, by way of example. It illustrates a differential amplifier comprising two transistors Tr.1 and Tr.2, having two outlets and two inputs, one of the two inputs being connected to a datum reference voltage $U_r$, and the input voltage $U_E$ being fed to the other. Two diodes connected in series with opposite polarity are situated between the two outlets, and the series circuit of the source of priming or biasing voltage and of the tunnel diode according to FIG. 3 is situated between the point of connection of the two diodes and the nonearthed terminal of the source of supply voltage. The equipolar terminals of the two sources of voltage are interconnected, the direction of traversal of the diodes is oriented towards the point of connection of the diodes with the tunnel diode.

If the bases of the two transistors are at the same potential, each transistor conducts half the current fed into the shared emitter infeed conductor. The voltage drops at the collector resistances R and R' are identical and of such magnitude that both diodes $D_1$ and $D_2$ are blocked and the tunnel diode is no longer live.

As the difference between the base potentials increases, the current of a transistor decreases as does the voltage at the corresponding collector resistance. The corresponding diode is rendered conductive thereby and the current through the same and through the tunnel diode can increase to the value determined by the collector resistance R or R' and the magnitude of the biasing voltage. The voltage at the tunnel diode concomitantly increases until it switches over into the high potential state. If the difference in potential at the bases of the transistors diminishes again, the tunnel diode is switched back into the low potential range. During this time, the other diode divides the collector of the transistor conducting the greater current, from the tunnel diode.

The response values of the control or supervision circuit are thus situated symmetrically to the datum or reference voltage $U_r$. Their spacing may be adjusted by varying the amplification of the transistors, that is to say by varying the magnitude of the emitter resistances. Another possibility of adjustment is provided by varying the biasing voltage $U_1$ of the tunnel diode, precise control thus being possible.

Figure 5:
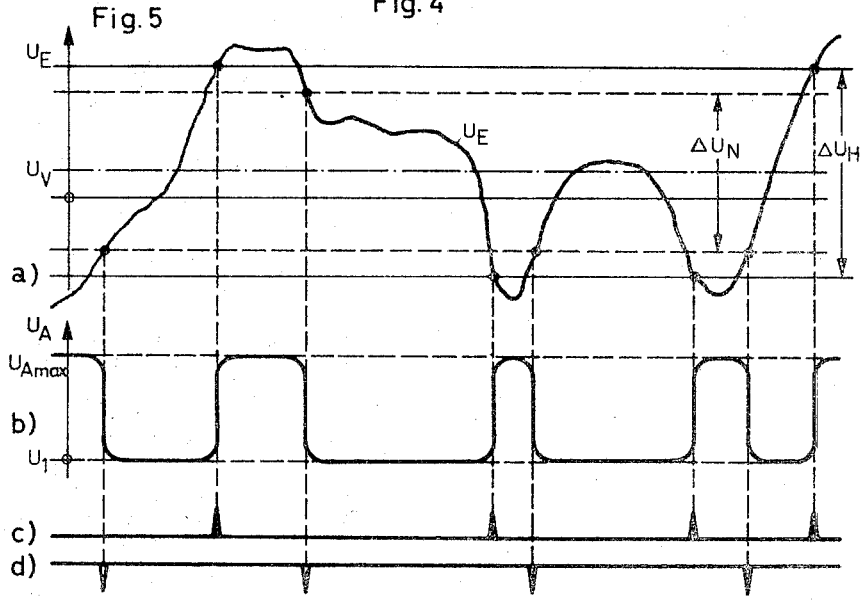
FIG. 5 illustrates the mode of operation of the said circuit.

The output voltage $U_A$ is obtained at the point of connection of the two diodes with the tunnel diode, the said point being marked A in FIG. 4, and the evolution of the said voltage being shown in FIG. 5b. FIG. 5a illustrates the evolution of an optional input voltage. This demonstrates that the range of evaluation extends symmetrically relative to $U_r$ and that the response values differ according to whether the tunnel diode is switched from the high-tension condition to the low-tension condition or vice versa. It is apparent from FIGS. 5c and 5d that when the limits of the voltage range are exceeded in either direction, this may be indicated by simple differentiation of the output voltage and by selection of the pulses obtained thereby, according to their polarity by means of a known type of differentiation circuit and polarity selection circuit connected at point A as indicated in FIG. 4.

I claim:

1. A circuit or switching arrangement comprising a tunnel diode, for the monitoring or control of a voltage range, in which is comprised a differential amplifier having two outlets, whereof one input is connected to a datum or reference voltage and between whose two outlets, at which the voltage varies inversely, is arranged a series circuit of two diodes connected with opposite polarity, and wherein a series circuit of a tunnel diode and an adjustable source of direct voltage is arranged between the point of connection of the said diodes and the nonearthed terminal of the source of supply voltage, in such manner that the equipolar terminals of the two sources of voltage are interconnected, the direction of traversal of the diodes being oriented towards the point of connection of the said diodes with the said tunnel diode, the output voltage also being tapped off at the said point of connection.

2. A circuit or switching arrangement as claimed in claim 1, in which the amplitude of the voltage range to be monitored or controlled extends symmetrically to the said datum or reference voltage by virtue of adjustment by varying the voltage supplied by the source of direct voltage connected in series with the said tunnel diode and/or by varying the magnitude of two identical emitter resistances in the input stage of the said differential amplifier.

3. A circuit or switching arrangement as claimed in claim 1, in which the position of the voltage range to be monitored or controlled is determined by the magnitude of the datum or reference voltage.

4. A circuit or switching arrangement as claimed in claim 1, in which the said datum or reference voltage is variable in order to resolve complex monitoring or control problems.

5. A circuit or switching arrangement as claimed in claim 1, in which indication of the fact that the limits of the said range have been exceeded in either direction is obtained by means for differentiation of the output voltage and selection of the pulses thus obtained, according to their polarity.